July 15, 1924.  V. E. CLARK  1,501,522
AIRCRAFT OBSERVATION WINDOW
Filed Oct. 26, 1921
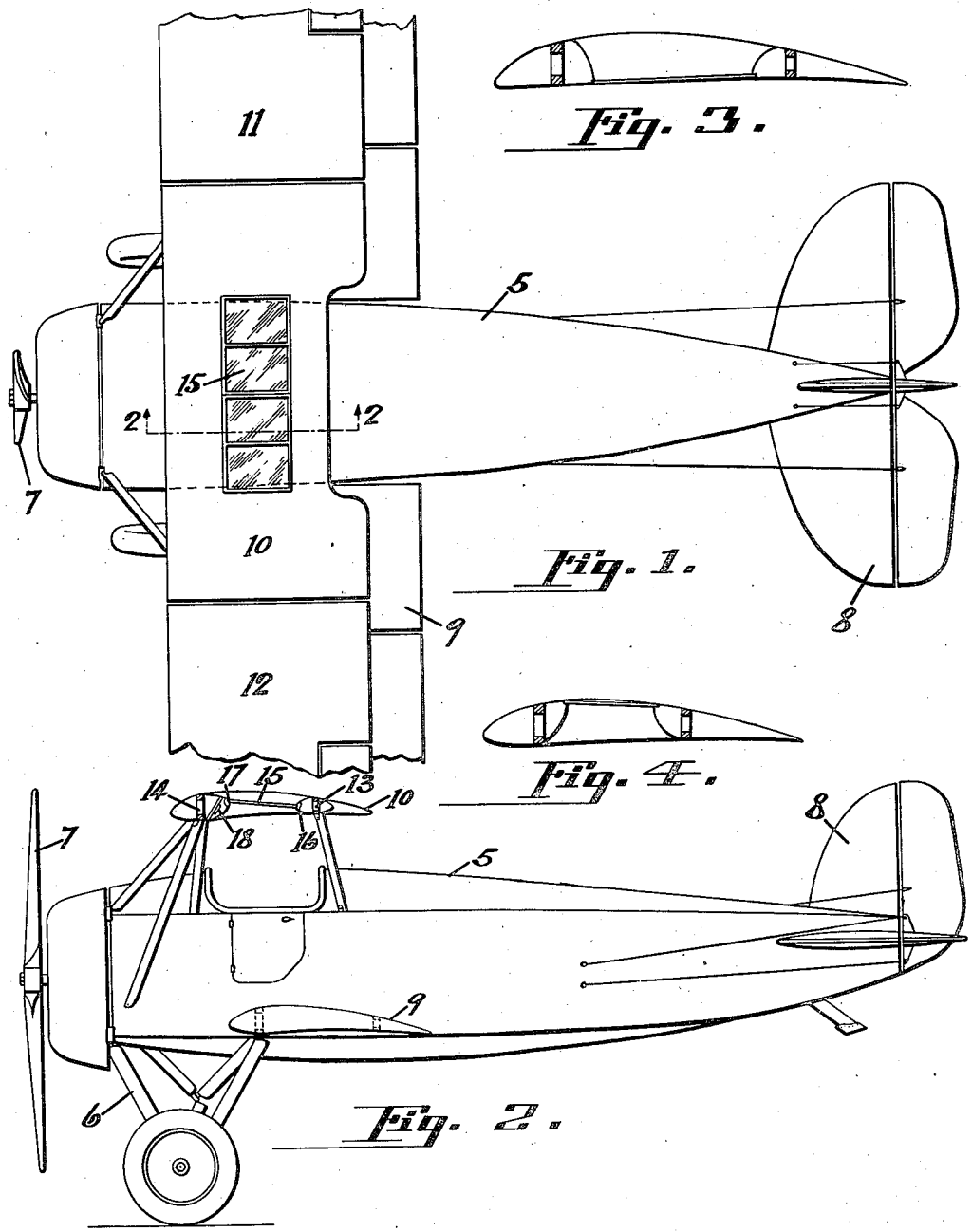
Witness.
Elmer E. Fred
A. Bondar
Inventor.
Virginius E. Clark
By Ralph H. Chilton
Attorney.

Patented July 15, 1924.

1,501,522

UNITED STATES PATENT OFFICE.

VIRGINIUS E. CLARK, OF DAYTON, OHIO, ASSIGNOR TO DAYTON-WRIGHT COMPANY, OF DAYTON, OHIO, A CORPORATION OF DELAWARE.

AIRCRAFT OBSERVATION WINDOW.

Application filed October 26, 1921. Serial No. 510,549.

*To all whom it may concern:*

Be it known that I, VIRGINIUS E. CLARK, a citizen of the United States of America, residing at Dayton, county of Montgomery, and State of Ohio, have invented certain new and useful Improvements in Aircraft Observation Windows (Docket #39), of which the following is a full, clear, and exact description.

This invention relates to aircraft and has as an object the provision of means for increasing the visibility from airplanes by placing a transparent section in the part of the wing which interferes with the vision.

Further objects and advantages of the present invention will be apparent from the following description, reference being had to the accompanying drawing, wherein a preferred form of embodiment of the present invention is clearly shown.

In the drawing:

Fig. 1 is a plan view of an airplane showing the window in the center section of upper plane.

Fig. 2 is a side elevation of the airplane but showing the upper wing in section on line 2—2 of Fig. 1.

Fig. 3 shows a modification wherein the window is positioned substantially flush with the bottom surface of the wing.

Fig. 4 shows another modification having the window substantially flush with the top surface of the wing.

In the drawing, like reference characters refer to like parts throughout the several views.

Numeral 5 represents the body or fuselage of the airplane shown in the drawing which is of the side by side type and therefore is quite wide relative to its other dimensions. 6 is the landing chassis, 7 the propeller, 8 the empennage, 9 the lower plane, 10 the center section of the upper plane, and 11 and 12 the right and left wings of the upper plane. The front and rear spars of the center section 10 are shown at 14 and 13 respectively.

The window 15 is cut in the center section between the front and rear spars thereof and hence does not interfere with the strength of the upper plane. The window may extend any desired length along the upper plane but preferably it is extended to the full width of the fuselage in this side by side plane in order that both pilot and passenger may have vision upwards through the top plane.

The transparent window 15 is preferably made of non-shatterable glass, there being one or more panes dependent on the size of the window, but if desired any other suitable transparent material may be used such as hard celluloid.

In the form shown in Fig. 2 of the drawing, the glass is suitably mounted in a wooden frame about midway of the thickness of the wing section at its rear edge 16 and slightly higher than midway at its front edge 17. The space immediately under the front edge 17 forms a very convenient place for the location of the instruments as shown at 18.

In Fig. 3 the glass is shown mounted substantially flush with the bottom of the wing section so that the air flow at the bottom of the wing is not affected by the window while the air flow at the top is not seriously affected because at the top the blast passes up above the wing and is comparatively quite small immediately adjacent the top of the wing.

In Fig. 4 the glass is shown mounted substantially flush with the top surface of the wing section, this modification causing only a very small decrease in aerodynamic efficiency according to wind tunnel tests.

If desired the window may have the glass mounted at both the top and bottom of the section in order to prevent loss of aerodynamic efficiency.

The window may be hinged, preferably on the sides so that the air blast will not seriously affect the operation thereof, so that in case of emergency the pilot may throw open the window and jump from the top of the wing with a parachute.

While I have illustrated my invention as applied to a biplane it is to be understood that it is also applicable to a monoplane and the window may be placed at any point in the wings other than in the center section.

While the forms of mechanism herein shown and described, constitutes preferred forms of embodiment of the present invention, it is to be understood that other forms might be adopted, all coming within the scope of the claims which follow.

What I claim is as follows:

1. An airplane wing having upper and lower cambered surfaces spaced apart giving the wing an appreciable thickness, and having an observation opening cut through both the upper and lower cambered surfaces, and a transparent window for closing said opening, said window being positioned between the planes of the upper and lower cambered surfaces.

2. An airplane wing having upper and lower cambered surfaces spaced apart giving the wing an appreciable thickness, and having an observation opening cut through both the upper and lower cambered surfaces, and a transparent window for closing said opening, said window being positioned between the planes of the upper and lower cambered surfaces, but nearer the plane of the upper surface.

In testimony whereof I hereto affix my signature.

V. E. CLARK.

Witnesses:
R. K. LEE,
L. H. EMRICK.